(12) United States Patent
Lavaur et al.

(10) Patent No.: US 8,692,405 B2
(45) Date of Patent: Apr. 8, 2014

(54) WIND GENERATOR WITH FOLDING MAST

(75) Inventors: Richard Lavaur, Waterloo (BE); Michel De Vivo, Louveciennes (FR); Alain Ghiretti, St Cry en Val (FR)

(73) Assignee: Alizeo, Paris (FR)

( * ) Notice: Subject to any disclaimer, the term of this patent is extended or adjusted under 35 U.S.C. 154(b) by 410 days.

(21) Appl. No.: 12/999,927

(22) PCT Filed: Sep. 19, 2008

(86) PCT No.: PCT/EP2008/062583
§ 371 (c)(1),
(2), (4) Date: Jan. 25, 2011

(87) PCT Pub. No.: WO2009/152869
PCT Pub. Date: Dec. 23, 2009

(65) Prior Publication Data
US 2011/0109098 A1 May 12, 2011

(30) Foreign Application Priority Data
Jun. 20, 2008 (WO) .................. PCT/EP2008/057907

(51) Int. Cl.
*F03D 9/00* (2006.01)
*H02P 9/04* (2006.01)
*B60L 11/02* (2006.01)
*B61C 9/38* (2006.01)
*F03B 13/00* (2006.01)

(52) U.S. Cl.
USPC .................. 290/55; 290/44; 290/45; 290/54

(58) Field of Classification Search
USPC .......................................... 290/44, 45, 54, 55
See application file for complete search history.

(56) References Cited

U.S. PATENT DOCUMENTS

| | | | | |
|---|---|---|---|---|
| 2,026,828 A | * | 1/1936 | Dunn | 290/55 |
| 2,207,964 A | * | 7/1940 | Albers | 416/13 |
| 2,273,084 A | * | 2/1942 | Ansley | 290/44 |
| 2,363,827 A | * | 11/1944 | Albers | 290/44 |
| 3,864,777 A | | 2/1975 | Perkons et al. | 14/38 |
| 4,081,081 A | * | 3/1978 | Morrow et al. | 212/178 |
| 4,242,043 A | * | 12/1980 | Poulsen | 416/11 |
| 4,362,466 A | * | 12/1982 | Schonball | 416/142 |
| 4,364,710 A | * | 12/1982 | Campbell | 416/142 |
| 4,415,813 A | * | 11/1983 | Carme | 290/44 |

(Continued)

FOREIGN PATENT DOCUMENTS

| | | |
|---|---|---|
| CZ | 290 785 | 7/2000 |
| DE | 40 29 932 | 3/1992 |

(Continued)

OTHER PUBLICATIONS

French Search Report from priority application No. EP/2008/057907; Report dated Apr. 3, 2008.

(Continued)

*Primary Examiner* — Pedro J Cuevas
(74) *Attorney, Agent, or Firm* — Miller, Mathias & Hull LLP (57) ABSTRACT

Wind generator comprising a folding mast pivotally mounted about an articulation positioned at a location some way between the lower and upper ends of the mast. The mast is actuated by a ram which is connected to the lower end of the mast.

13 Claims, 9 Drawing Sheets

(56) References Cited

U.S. PATENT DOCUMENTS

| | | | |
|---|---|---|---|
| 4,449,634 A * | 5/1984 | Buzzichelli et al. | 212/196 |
| 4,449,889 A * | 5/1984 | Belden | 416/16 |
| 4,512,106 A * | 4/1985 | Roche | 49/445 |
| 4,590,718 A * | 5/1986 | Angeloff | 52/116 |
| 4,630,996 A | 12/1986 | Masaki | 416/16 |
| 4,817,698 A * | 4/1989 | Rossini et al. | 160/107 |
| 5,252,029 A * | 10/1993 | Barnes | 416/142 |
| 5,295,793 A * | 3/1994 | Belden | 416/13 |
| 5,354,175 A * | 10/1994 | Coleman et al. | 416/9 |
| 5,421,051 A | 6/1995 | Patten | 14/37 |
| 5,572,837 A * | 11/1996 | Featherstone et al. | 52/118 |
| 5,746,576 A * | 5/1998 | Bayly | 416/16 |
| 6,327,957 B1 * | 12/2001 | Carter, Sr. | 91/41 |
| 6,974,307 B2 * | 12/2005 | Antoune et al. | 416/9 |
| 6,979,175 B2 * | 12/2005 | Drake | 416/11 |
| 7,192,252 B2 * | 3/2007 | Duguet et al. | 416/142 |
| 8,449,257 B2 * | 5/2013 | Lavaur et al. | 416/142 |
| 8,496,423 B2 * | 7/2013 | Springett et al. | 414/10 |
| 2003/0071004 A1 * | 4/2003 | Higgins | 212/292 |
| 2010/0140951 A1 * | 6/2010 | Pitre | 290/55 |
| 2010/0181768 A1 * | 7/2010 | Lavaur et al. | 290/44 |
| 2010/0308174 A1 * | 12/2010 | Calverley | 244/155 A |
| 2012/0308338 A1 * | 12/2012 | von Ahn | 414/10 |
| 2013/0243559 A1 * | 9/2013 | Springett et al. | 414/800 |

FOREIGN PATENT DOCUMENTS

| | | | |
|---|---|---|---|
| EP | 0 033 258 | 8/1981 | |
| EP | 1 679 282 | 7/2006 | |
| FR | 2 295 259 | 7/1976 | |
| FR | 2 446 930 | 8/1980 | |
| FR | 2 519 710 | 7/1983 | |
| FR | 2 568 948 | 2/1986 | |
| FR | 2 861 141 | 4/2005 | |
| FR | 2912450 A1 * | 8/2008 | |
| FR | 2918420 A1 * | 1/2009 | F03D 11/04 |
| FR | 2920206 A1 * | 2/2009 | F03D 11/04 |
| GB | 3006 | 0/1909 | |
| GB | 740 224 | 11/1955 | |
| NL | 7 801 247 | 8/1979 | |
| WO | WO 00/36299 | 6/2000 | |
| WO | WO 2009152869 A1 * | 12/2009 | F03D 11/04 |

OTHER PUBLICATIONS

International Search Report and Written Opinion from priority application EP/2008/057907; Report dated Sep. 10, 2008.

International Search Report and Written Opinion from counterpart application PCT/EP2008/062583; Report dated Mar. 18, 2009.

* cited by examiner

WIND GENERATOR WITH FOLDING MAST

CROSS-REFERENCE TO RELATED APPLICATIONS

This application is a U.S. national stage filing under 35 USC §371 and Chapter II of the PCT of International Patent Application No. PCT/EP2008/062583 filed on Sep. 19, 2008, which claims priority to European PCT Application No. EP2008/057907, filed on Jun. 20, 2008.

FIELD OF THE DISCLOSURE

1. Field of the Invention

The present invention relates to wind generators with folding masts.

2. Background of the Disclosure

More specifically, the invention relates to a wind generator comprising:
- a mast extending along a longitudinal axis between a lower end and an upper end, said mast being connected to the ground by an articulation and pivotally mounted about said articulation between a substantially vertical erect position and a substantially horizontal folded-down position, the articulation being positioned between the lower and upper ends of the mast, the mast comprising a lower part, situated between the articulation and the lower end, which counterweights the nacelle and an upper part of the mast situated between the articulation and the nacelle, a counterweight being movably connected to the lower part of the mast,
- a nacelle borne by the upper end of the mast, this nacelle comprising a rotor bearing a turbine,
- at least one main ram connected to the mast and adapted to make said mast pivot between the erect position and the folded-down position.

Wind generators of this type can thus be folded down when the wind is strong, particularly in areas prone to cyclones.

The ability to fold the mast is also beneficial in simplifying the initial erection and maintenance of the wind generator.

Document WO-A-00/36299 describes a wind generator of this type, the articulation of which is positioned at the lower end of the mast. A wind generator of this type requires a particularly powerful ram which, given the long stroke that a ram such as this needs to have, makes it particularly expensive and technically rather unsuitable and somewhat unreliable specially for wind generators of high power.

SUMMARY OF THE DISCLOSURE

It is a particular object of the present invention to alleviate this disadvantage.

To this end, according to one aspect of the invention, a wind generator of the kind in question is characterized in that said main ram is connected between a fixed support and the lower part of the mast.

By virtue of these-arrangements, the stroke of the ram can be less than in the prior art, and therefore the ram can be less expensive and more reliable, and this can be achieved without the need for particularly complex arrangements.

In various embodiments of the wind generator according to the invention, recourse may also possibly be had to one and/or other of the following arrangements:
- the main ram is hydraulic;
- the main ram extends under the lower part of the mast up to a pivot connected to the lower end of the mast;
- the main ram extends in a longitudinal direction which is inclined of less than 30° with a horizontal plane;
- a counterweight is movably connected to the lower part of the mast, and the wind generator comprises a control device including at least one actuator connecting the moving counterweight to the mast and adapted to move the counterweight so that a center of gravity of the counterweight is moved toward and away from said articulation along the longitudinal axis of the mast;
- the control device is adapted to move the counterweight in synchronism with pivoting of the mast so as to move said center of gravity progressively:
  away from the articulation as the mast is pivoting into the folded-down position,
  and closer to the articulation as the mast is pivoting into the erect position;
- the control device is adapted to move the counterweight as a function of a tilt angle of the mast so as to balance at least partially a torque applied to said mast by gravity during pivoting of the mast;
- the control device is adapted to move the counterweight as a function of an external force applied to the mast by the wind so as to balance at least partially a torque applied to said mast by said external force during pivoting of the mast;
- the counterweight is mounted on a pivot at the lower end of the mast and the main ram is pivotally connected to said pivot;
- the counterweight extends under the lower end of the mast and forms a vertical slot, and the main ram extends in said slot under the lower part of the mast up to said pivot;
- the lower part of the mast with the counterweight have a first mass, the upper part of the mast and the nacelle together having a second mass, the first mass ranging between 30% and 300% of the second mass, preferably between 50% and 150% of the second mass;
- the counterweight is adapted to engage with a fixed anchoring device when the mast is in the erect position so as to lock the mast in said erect position, and the control mechanism is adapted to selectively engage and disengage the counterweight from the fixed anchoring device;
- the counterweight is shaped to cooperate by fitting with said fixed anchoring device in a substantially vertical direction;
- the lower part of the mast has a first height and the upper part of the mast has a second height, the first height ranging between 10% and 50% of the second height, preferably between 15% and 25% of the second height;
- the lower part of the mast includes an electrical generator, the rotor driving said electrical generator through a transmission device extending along the mast;
- the main ram is able to exert an effort of 500 to 1000 t, and has an extension of 7 to 12 m.

Further features and advantages of the invention will become apparent in the course of the following description of two embodiments thereof which are given by way of non limiting examples and with reference to the attached drawings.

DETAILED DESCRIPTION OF THE DISCLOSURE

In the various figures, the same references denote elements that are identical or similar.

Figure 1:
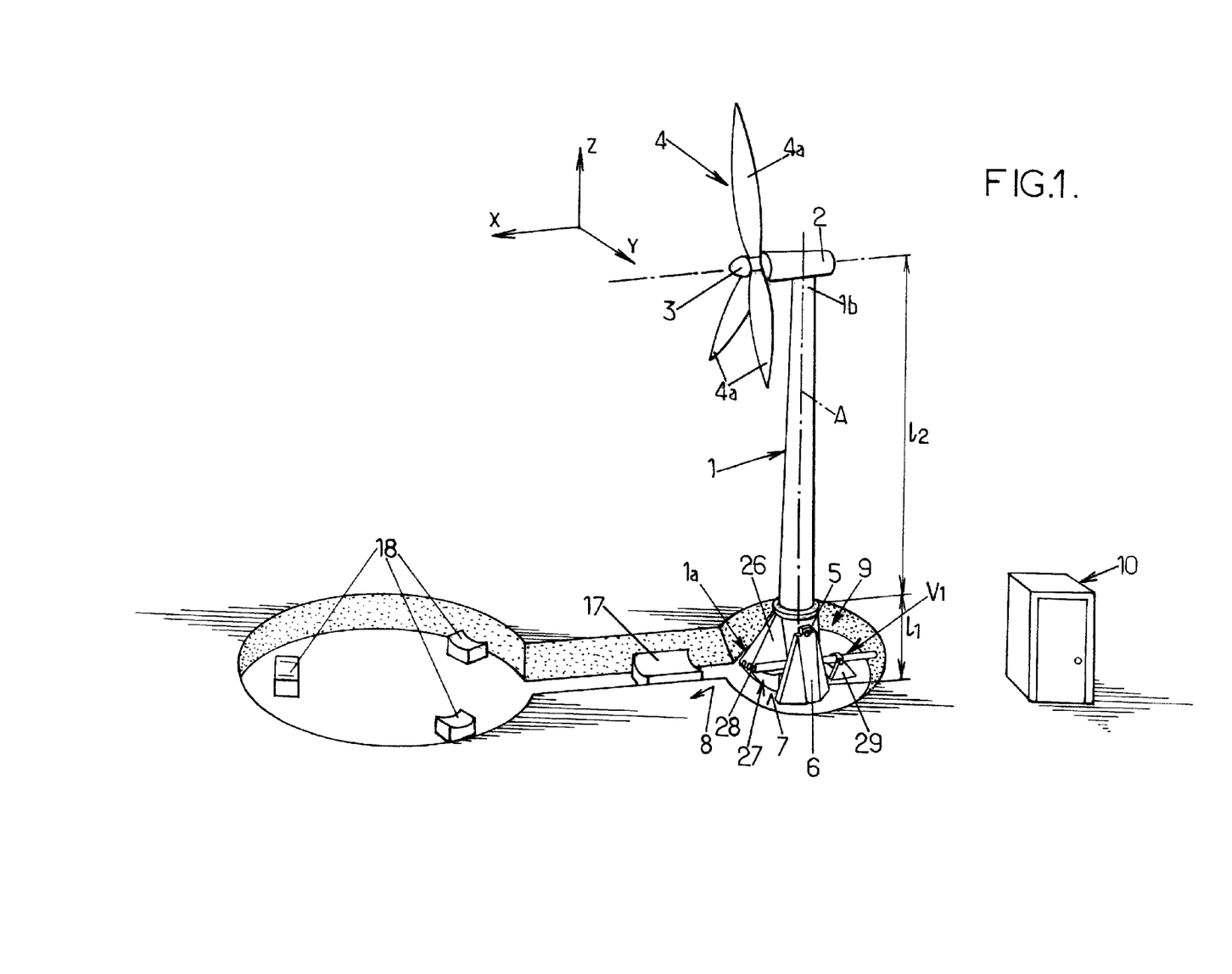
FIG. 1 is a schematic perspective view of a wind generator according to a first embodiment of the invention, with its mast in the erect position.
Figure 3:
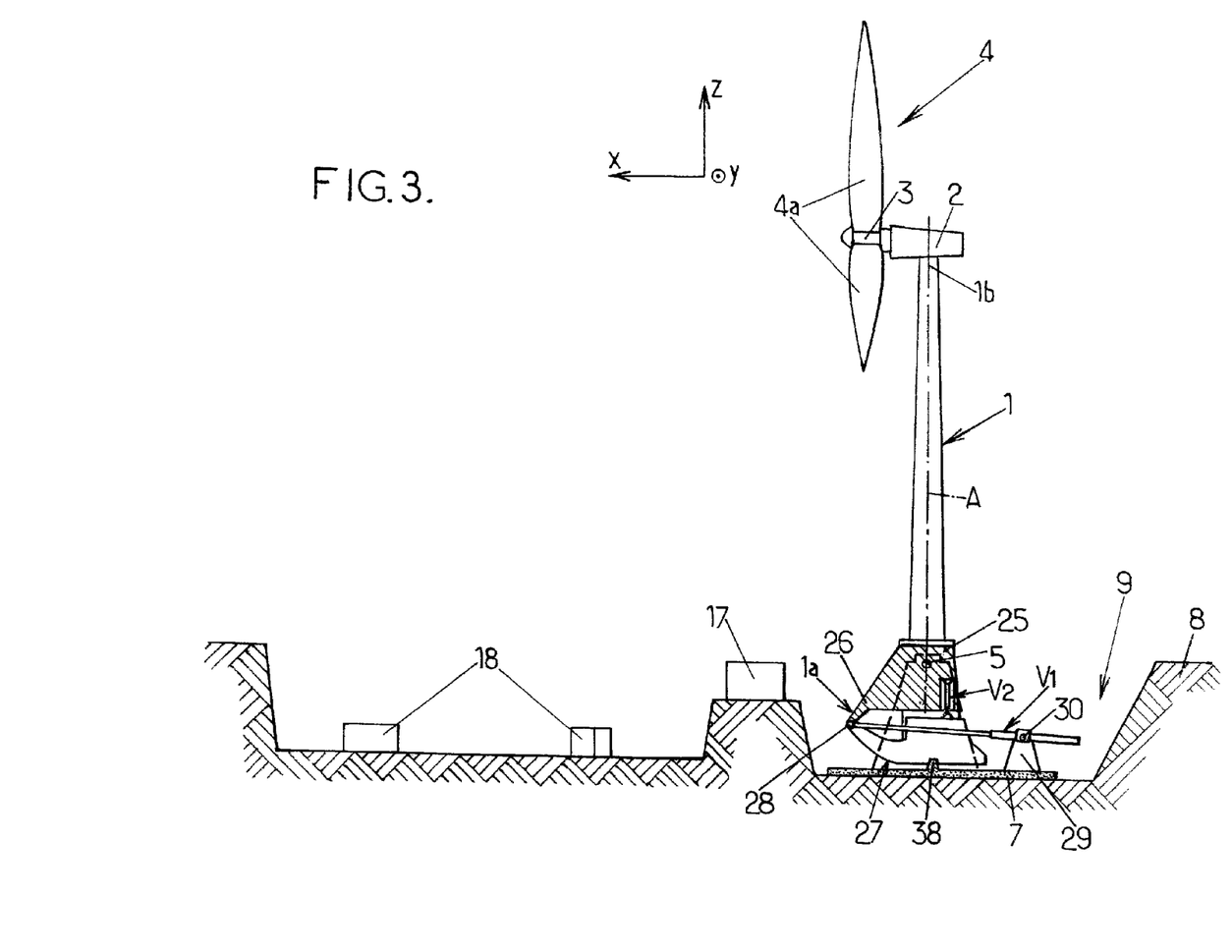
FIG. 3 is an elevation of the wind generator of FIG. 1, in the erect position, one of the mast cheek plates having been omitted for greater clarity.

As depicted in FIGS. 1 and 3, the invention relates to a wind generator comprising:
- a support mast 1 extending between a lower end 1a and an upper end 1b,
- a nacelle 2 pivotally mounted at the upper end of the support mast 1 about a vertical axis Z, the nacelle 2 containing, in particular, an alternator,
- a rotor 3 mounted to rotate about a substantially horizontal axis R and borne by the nacelle 2, the rotor 3 bearing a turbine 4 with several blades 4a which is designed to run the alternator contained in the nacelle 2.

Without implying any limitation, the support mast 1 may extend over a height to about 50 to 100 m and its metallic structure may for example weigh around 50 tons (not including the ballast and counterweight mentioned hereinbelow), while the nacelle 2, including the rotor and the turbine 4, may weigh 50 to 70 tons. The support mast 1 may be a hollow mast of, for example, circular or some other cross section, of a width which may be of the order of 3 to 4 m at its bottom.

The mast 1 is pivotally mounted about an articulation 5, for example a simple pivot, which allows the mast 1 to pivot about a horizontal axis Y. The mast 1 can thus pivot in a vertical plane X, Z between the erect position depicted in FIG. 1 and a folded-down position depicted in FIG. 5.

Figure 5:
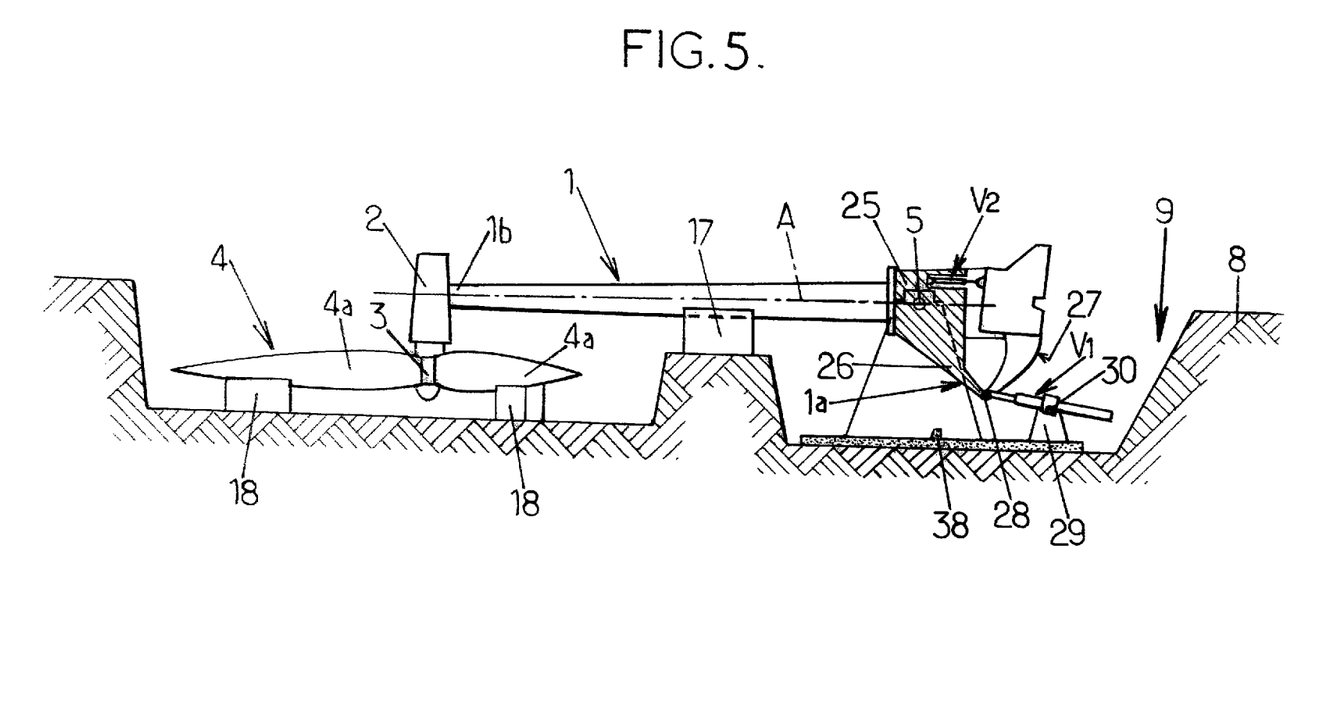

The articulation 5 may connect the mast 1 for example to two vertical cheek plates 6 which are anchored in a support pedestal 7 (of concrete or metal for instance) fixed to the ground 8.

The mast 1 is made to pivot by an actuator V1, for example one or more main hydraulic ram(s) which connects/connect the mast 1 to the aforementioned pedestal 7.

Figure 2:
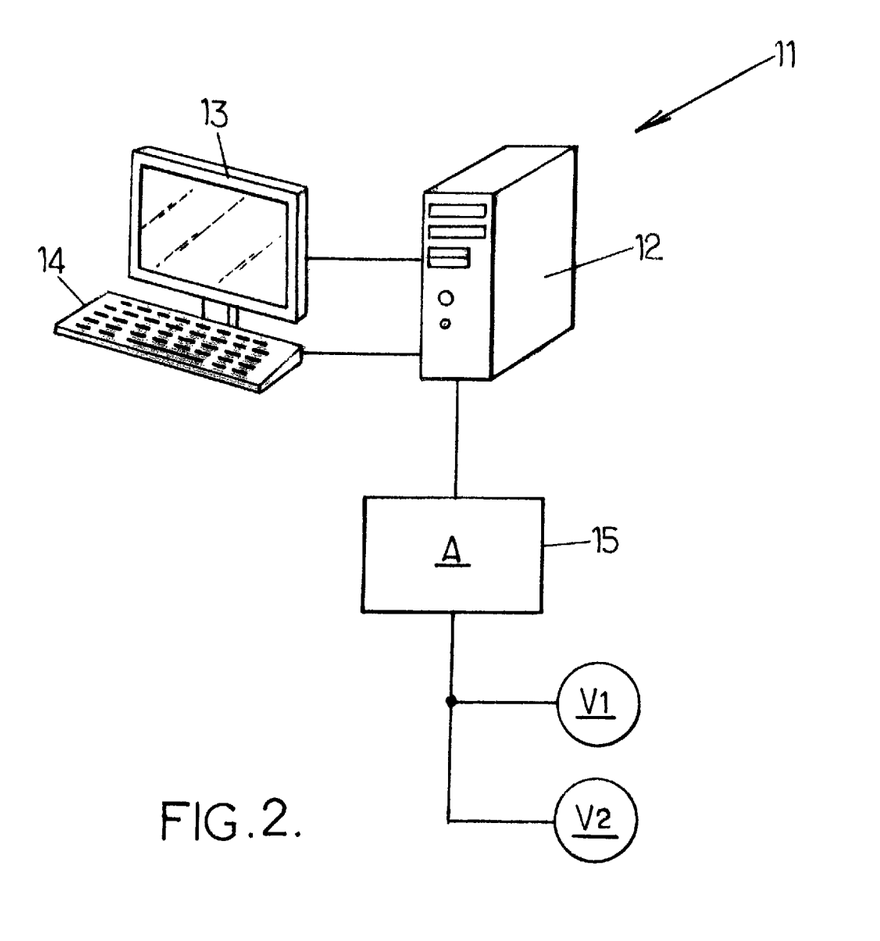
FIG. 2 is a block diagram showing part of the device for controlling the wind generator of FIG. 1.

This ram V1 can be controlled, for example from a control station 10 situated near the wind generator or remotely, by a control device which may in particular, as depicted in FIG. 2, comprise a microcomputer 12 or the like, provided with the customary interfaces such as a screen 13, a keyboard 14 and the like and controlling, for example, a controller 15 (A) which itself controls the ram V1.

The hydraulic part of the control of the ram V1 is not depicted but is well known to those skilled in the art.

As depicted in FIGS. 1 and 3, according to the invention, the articulation 5 is positioned at a location some way between the lower 1a and upper 1b ends of the mast 1 such that the lower part of the mast, situated between the articulation 5 and the lower end 1a counterweights the nacelle and the upper part of the mast situated between the articulation 5 and the upper end 1b of the mast. The ratio 11/12 between the height 11 of the lower part of the mast and the height 12 of the upper part of the mast may for example range between 10 and 50% and in particular between 15 and 25%.

The lower part of the mast is preferably weighted with a counterweight 27 based a dense material, for example cast iron, concrete, clinker, sand or the like (when said dense material is a non-cohesive material such as sand or clinker for example, the dense material in question is contained in a rigid casing made of steel or the like). The counterweight 27 may for example have a mass ranging between 30 and 300 tons according to the situation, namely approximately 30 to 300% of the mass of the upper part of the mast and of the nacelle 2, or preferably approximately 50 to 150% of this mass represented by the upper part of the mast 1 and the mass 12. More generally, the lower part of the mast 1 with the counterweight 27 may have a first mass, the upper part of the mast 1 and the nacelle 2 together having a second mass, the first mass ranging between 30% and 300% of the second mass, preferably between 50% and 150% of the second mass.

In the embodiment shown in FIGS. 1 and 3, the counterweight 27 is a moving counterweight, the center of gravity G of which can be positioned a variable distance from the articulation 5. In the particular example depicted, the moving counterweight 27 is pivotally mounted about an articulation 28 at the lower end 1a of the mast 1.

The moving counterweight 27 can be operated by an actuator V2 such as a hydraulic ram for example, which connects said moving counterweight to the mast 1. Actuator V2 is itself incorporated into the control device 11 described previously (FIG. 2) and controlled by the aforementioned controller 15.

Figure 6:
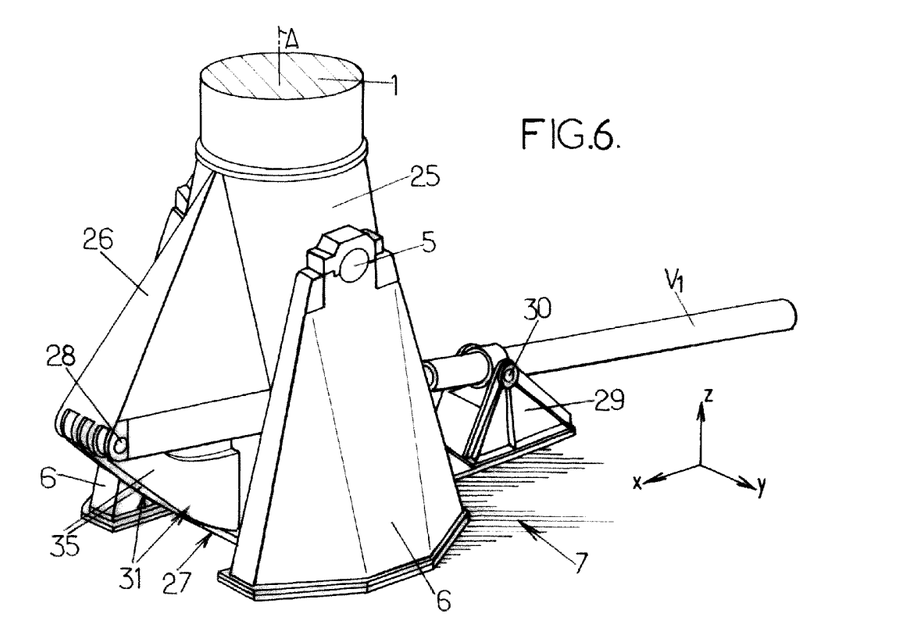
FIGS. 6 and 7 are perspective views, viewed in two different directions, of the lower part of the mast of the wind generator of FIG. 1 in the erect position.
Figure 7:
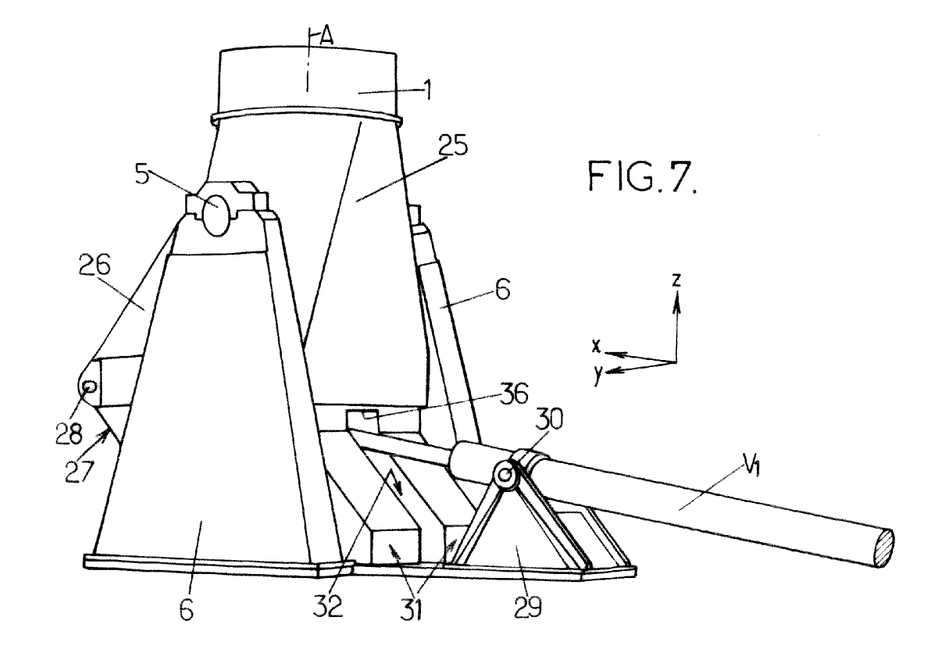
Figure 8:
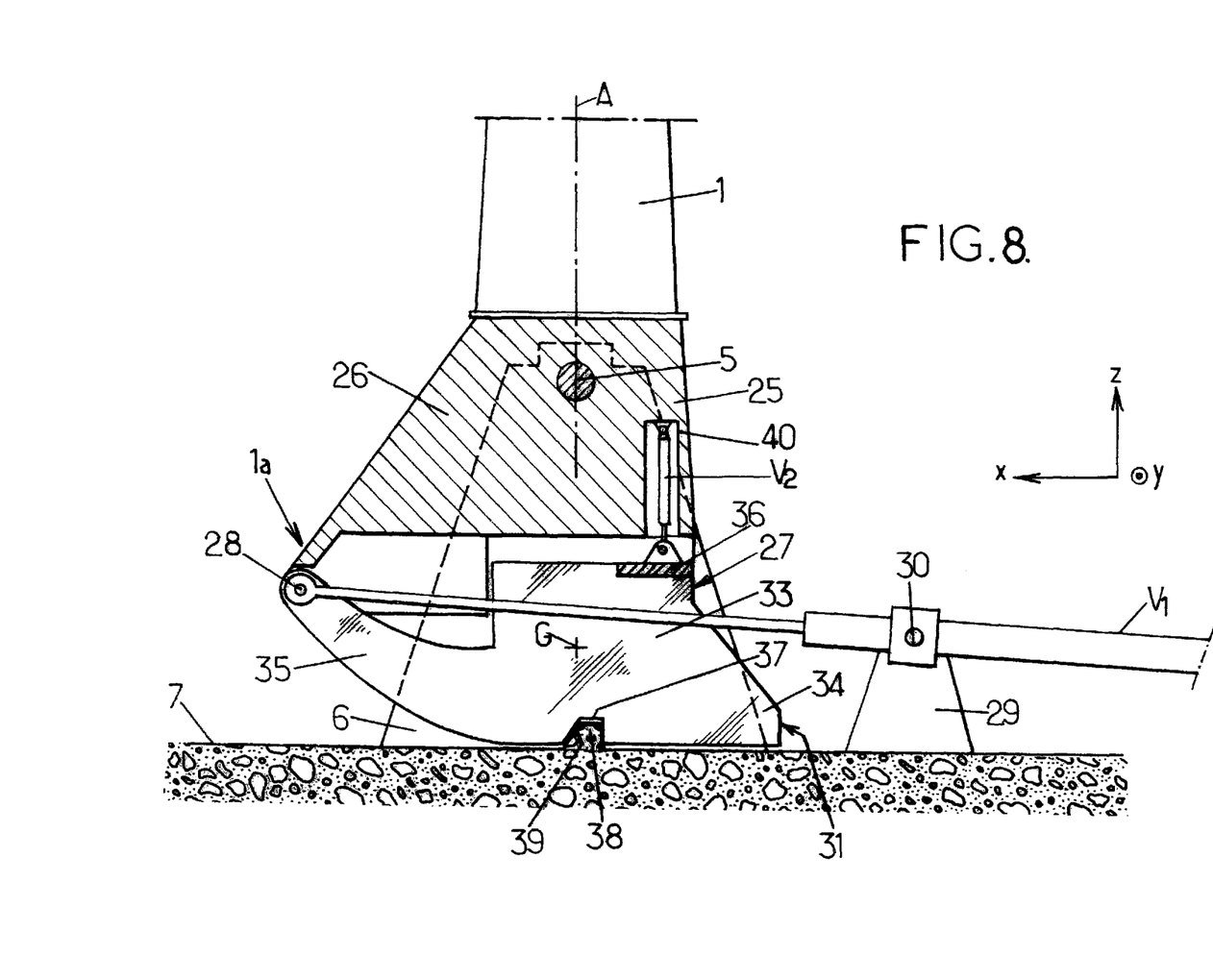
FIG. 8 is a vertical section of the lower part of the mast of the wind generator of FIGS. 6 and 7.

As shown in FIGS. 6-8, the lower part 25 of the mast 1 may form a ballast which is fixed with regard to the mast and which may be made for instance of cast iron, concrete or other dense material as previously described for the first embodiment, said ballast having a center of gravity which is situated under the articulation 5 in the erect position of the mast.

The lower portion 25 of the mast may be extended opposite the ram V1, by a lateral extension 26. The movable counterweight 27 is pivotally mounted at the lower end of the extension 26 (i.e. at the lower end 1a of the mast 1), by said pivot 28.

The stem of the ram V1 may be pivotally connected to said pivot 28 and may extend under the ballast 25, toward a support 29 on which the cylinder of the ram V1 is pivotally mounted around an articulation 30. The support 29 is offset laterally from the mast 1 in the direction X, opposite the pivot 28.

The counterweight 27 may for instance include two vertical side plates 31 which extend parallel to the plane X,Z and which define a vertical slot 32 in-between. The ram V1 extends in said slot 32 up to the pivot 28.

The vertical side plates 31 may for instance each include a central main portion 33 extending in the X direction between:
- a front portion 34, protruding horizontally toward the support 29,
- and a rear arm 35 extending opposite the support 29 up to a rear end which is connected to the pivot 28.

The central main portions 33 of the side plates 31 are connected together by an upper bridge 36 extending between the side plates in the Y direction, and the hydraulic ram V2 may be connected for instance between said bridge 36 and the lower portion 25 of the mast, so as to control the pivoting of the counterweight 27 in a similar fashion as in the first embodiment. The ram V2 may be received for instance in a recess 40 hollowed out in the lower portion 25 of the mast.

Besides, the side plates 31 of the counterweight 27 may further include respectively two lower notches 37 which are disposed in mutual correspondence and which are adapted to engage by fitting on a corresponding transverse rib 38 belonging to the pedestal 7. This transverse rib may for instance be a concrete rib (specially when the pedestal 7 is itself made out of concrete) and may be covered by a metal profile 39 on which the notches 37 of the side plates may engage.

The wind generator may be operated as follows.

When the mast 1 is in the erect position as shown in FIGS. 1, 3 and 6-8, the counterweight is pushed downward by the ram V2 so as to maintain the notches 37 of the counterweight engaged on the transverse rib 38, thereby locking the mast 1 in the erect position. The transverse rib 38 thus constitutes a fixed anchoring device with which the counterweight 27 cooperates by fitting engagement when the mast 1 is erect, in order to lock said mast in the erect position.

Figure 4:
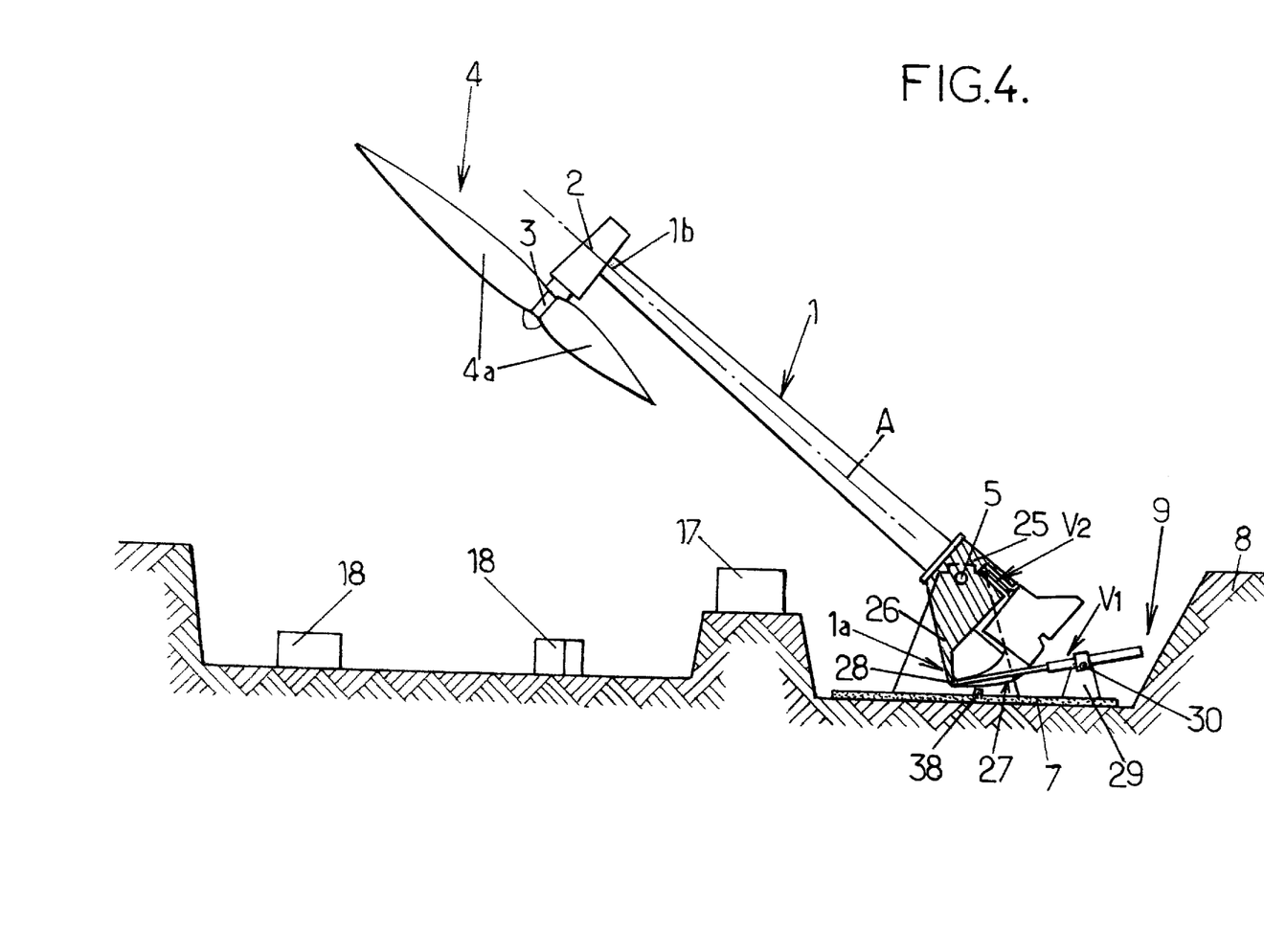
FIGS. 4 and 5 are views similar to FIG. 3 of the wind generator in the process of being folded down and in the folded-down position, respectively.
Figure 9:
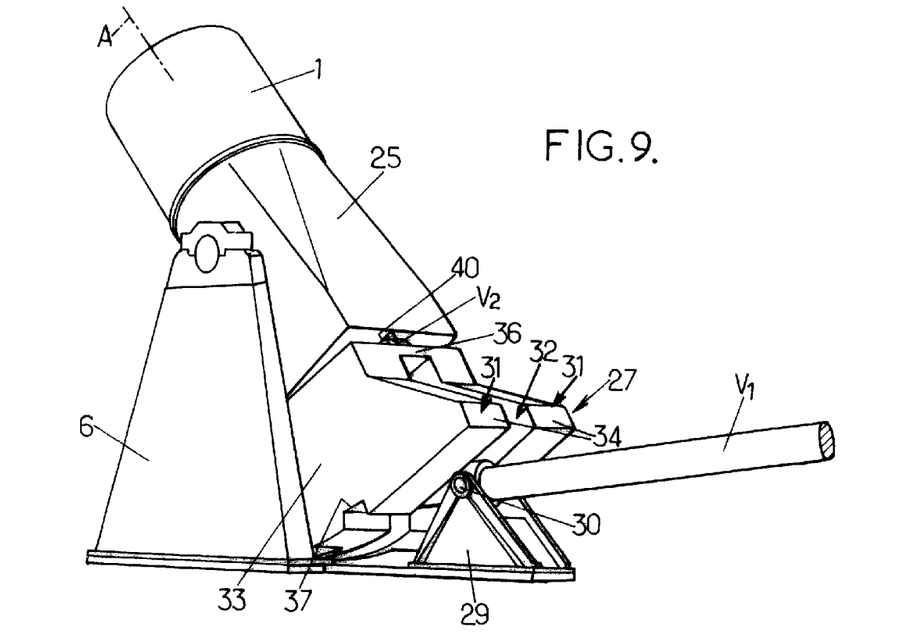
FIGS. 9 and 10 are perspective views showing the lower part of the mast of the wind generator of FIGS. 6-8, respectively in the process of being folded down and in the folded-down position.
Figure 10:
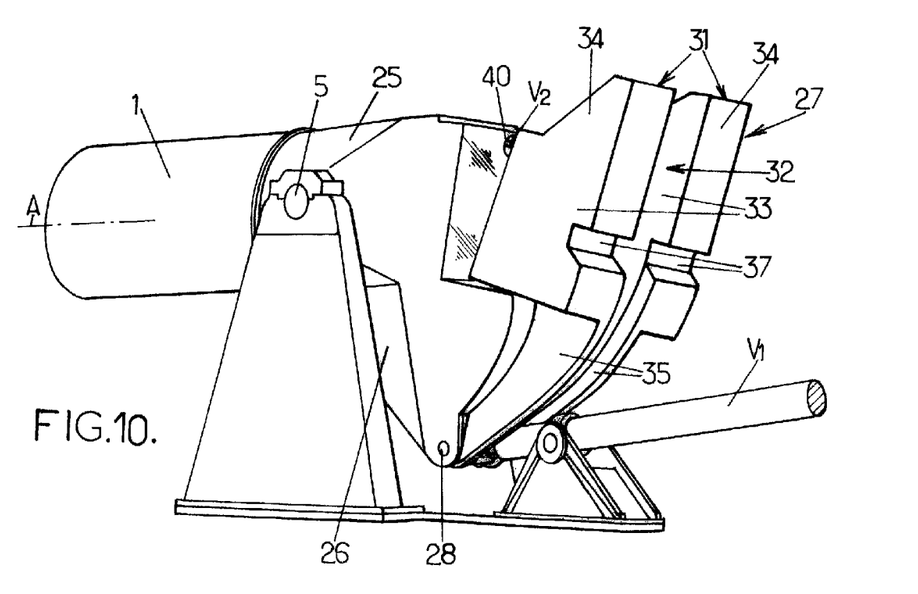

When the mast 1 has to be folded down, the ram V2 initially raises the counterweight 27 so that the notches 37 of the counterweight disengage from the transverse rib 38, the ram V1 pivots the mast 1 downward as shown in FIGS. 4 and 9, until the mast 1 is completely folded down in the horizontal position as shown in FIGS. 5 and 10.

During this process, the ram V2 is controlled so as to pivot the counterweight 27 during the pivoting of the mast, to move progressively the center of gravity G of the counterweight 27 away from the articulation 5 along the longitudinal axis A of the mast when the mast 1 is pivoting downward toward the folded down position. Thus, the counterweight 27 is pivoted in its position farthest from the articulation 5 when the mast is in the folded down position (FIGS. 5 and 10).

When the mast 1 is raised again, the counterweight 27 is progressively pivoted toward the lower portion 25 of the mast, i.e. toward a position where the center of gravity G is closest to the articulation 5.

Thus, the movement of the counterweight 27 may be controlled according to the tilting of the mast 1, so that said movement compensates at least partially for the torque created by the mast 1, the nacelle 2, the rotor 3 and the turbine 4 when the mast 1 is inclined. The movements of the counterweight 27 are computed by the computer 12 and/or controller 15 based on the tilting of the mast 1, and the controller 15 then controls the ram V2 to actuate the counterweight so that it follows the necessary movements.

Further, the movement of the counterweight 27 could be controlled not only according to the tilting of the mast 1, but also according to the additional external forces which may be applied to the wind generator during the pivoting movements of the mast, for instance according to the efforts applied by the wind. Such additional external forces may be measured through the efforts applied to the ram V1 or computed from the outputs of various sensors (e.g. an anemometer—not shown in the drawings). In this case, the movements of the counterweight 27 are computed by the computer 12 and/or controller 15 based on the tilting of the mast 1 and on said additional external forces, and the controller 15 then controls the ram V2 to actuate the counterweight so that it follows the necessary movements.

To control the above movements of the mast 1, the ram V1 may for instance be such that it is able to exert an effort of 500 to 1000 t, and such that the stem of the ram may have a maximum extension (when the mast 1 is erect) of 7 to 12 m (i.e. the stem is moved 7 to 12 m in the longitudinal direction of the ram V1 between the extended and retracted positions of the stem). The connection of the ram to the lower part of the mast 1 thus enables to limit the necessary extension of the stem between the retracted and extended positions thereof, therefore enabling to use existing rams of high power, and therefore to limit costs, by enabling to limit the extension of the ram to reasonable values.

During the movements of the mast 1, the inclination of the ram V1 on the horizontal remain always less than 30°.

It should be noted that in a variant (not shown), the hydraulic ram V2 could, if appropriate, be replaced by a winch associated with a cable, the winch being fixed for example to the mast 1 and the free end of the cable fixed to the moving counterweight 27 (or conversely, the winch could be fixed to the moving counterweight and the free end of the cable could be fixed to the mast 1).

Besides, in another variant (not shown), the counterweight 27 could be fixed with regard to the mast 1 instead of being pivotally mounted at the lower end of the mast 1, in which case the ram V2 and the transverse rib 38 and profile 39 would be omitted.

When the mast 1 is in the folded-down position as depicted in FIG. 5, it may if appropriate rest on a support cradle 17 fixed to the ground, and the blades 4a of the turbine may also, if appropriate, rest on bearers 18 also fixed to the ground. These bearers 18 intended to accept the blades 4a of the turbine may if appropriate be made of a soft material or have bearing regions made of soft material, to avoid damage to the turbine blades 4a.

Advantageously, the pedestal 7 may be made in a depression 9 dug into the ground, this depression having a shape that substantially complements the shape of the wind generator once it is in the folded-down position, so that this wind generator offers little wind resistance and does not visually pollute the landscape when in the folded-down position.

Figure 11:
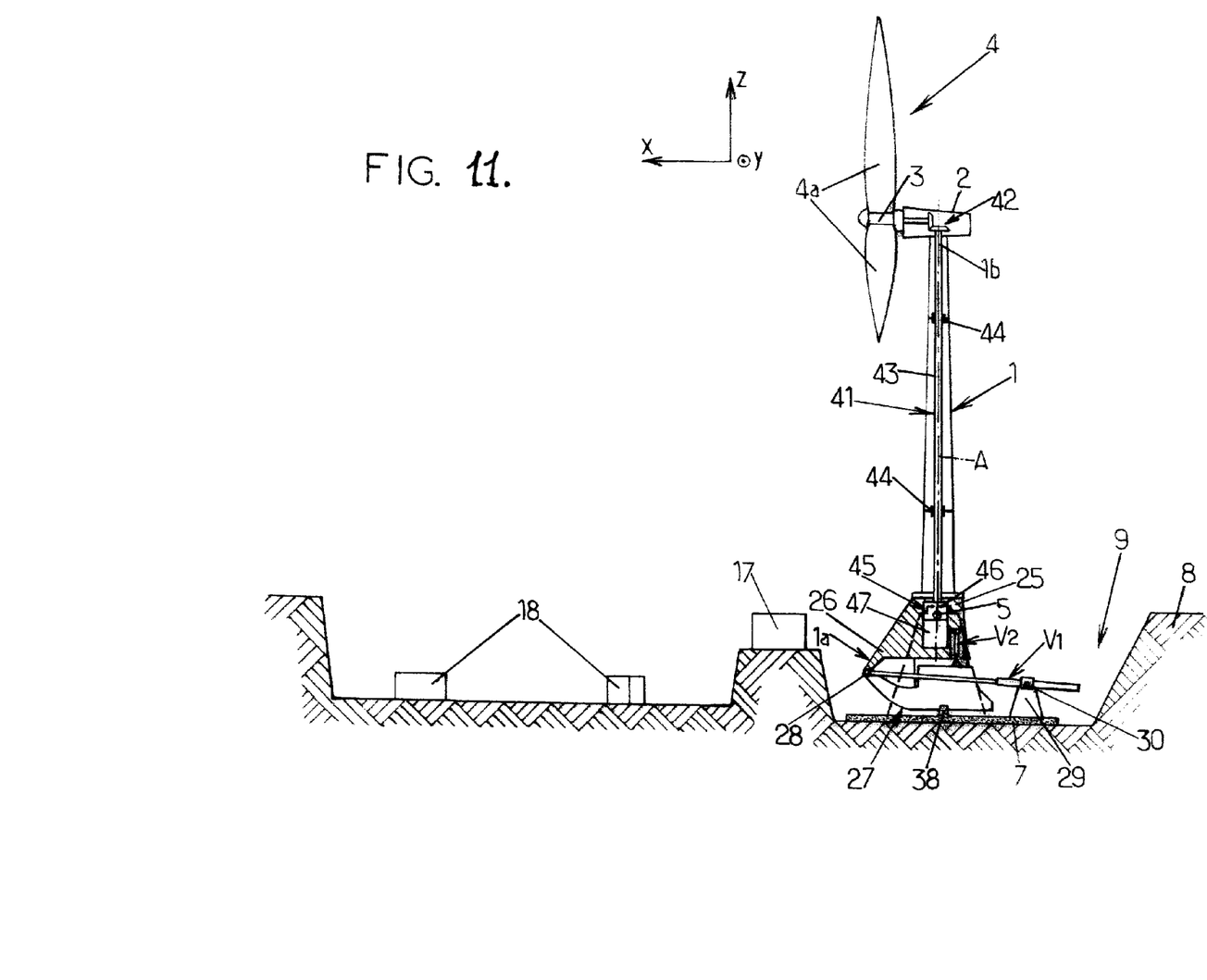
FIG. 11 is view similar to FIG. 3 in a second embodiment of the invention.

The second embodiment of the invention, shown in FIG. 11, is similar to the first embodiment in its structure and operation, and will therefore not be described in detail here. This second embodiment distinguishes from the first embodiment in that the nacelle 2 does not include anymore the electrical generator 45, which is included in the ballast 26 of the lower part of the mast.

The rotor 3 drives said electrical generator 45 through a transmission device 42, 43 extending along the mast. Such transmission device may for instance include an angle transmission 42 connecting the rotor 3 to a vertical rotary shaft 43 extending vertically along the mast 1 up to the generator 45. The shaft 43 may be borne by bearings 44 inside the mast 1. The angle transmission 42 and shaft 43 could be replaced by another transmission, e.g. a belt or chain transmission, or a hydraulic transmission.

The electrical generator may include a gearbox 46 driven by the shaft 43 and an alternator 47 which is in turn driven by the gearbox.

The invention claimed is:

1. A wind generator comprising:
a mast extending along a longitudinal axis between a lower end and an upper end, said mast being connected to the ground by an articulation and pivotally mounted about said articulation between a substantially vertical erect position and a substantially horizontal folded-down position, the articulation being positioned between the lower and upper ends of the mast, a nacelle mounted at the upper end of the mast to pivot around a vertical axis in use, the mast comprising a lower part, situated between the articulation and the lower end, which counterweighs the nacelle and an upper part of the mast situated between the articulation and the nacelle, the nacelle comprising a rotor, mounted to rotate about a substantially horizontal axis in use and bearing a turbine, at least one main ram connected to the mast and adapted to make said mast pivot between the erect position and the folded-down position, wherein said main ram is connected between a fixed support and the lower part of the mast, said fixed support being at ground-level and directly connected to the ground, wherein the lower part of the mast includes a lateral extension opposite said fixed support, and the main ram extends under the lower part of the mast up to a pivot connected to said lateral extension, and wherein the main ram extends in a longitudinal direction which is inclined at less than 30° relative to a horizontal plane.

2. The wind generator according to claim 1, wherein the main ram is hydraulic.

3. The wind generator according to claim 1, wherein a counterweight is movably connected to the lower part of the mast, and the wind generator comprises a control device including at least one actuator connecting the moving counterweight to the mast and adapted to move the counterweight so that a center of gravity of the counterweight is moved toward and away from said articulation along the longitudinal axis of the mast.

4. The wind generator according to claim 3, wherein the control device is adapted to move the counterweight as a function of a tilt angle of the mast so as to balance at least partially a torque applied to said mast by gravity during pivoting of the mast.

5. The wind generator according to claim 4, wherein the control device is adapted to move the counterweight as a function of an external force applied to the mast by the wind so as to balance at least partially a torque applied to said mast by said external force during pivoting of the mast.

6. The wind generator according to claim 3, wherein the counterweight is mounted on a pivot at the lower end of the mast and the main ram is pivotally connected to said pivot.

7. The wind generator according to claim 6, wherein the counterweight extends under the lower end of the mast and forms a vertical slot, and the main ram extends in said slot under the lower part of the mast up to said pivot.

8. The wind generator according to claim 3, wherein the lower part of the mast with the counterweight have a first mass, the upper part of the mast and the nacelle together having a second mass, the first mass ranging between 30% and 300% of the second mass, preferably between 50% and 150% of the second mass.

9. The wind generator according to claim 3, wherein the counterweight is adapted to engage with a fixed anchoring device when the mast is in the erect position so as to lock the mast in said erect position, and the control mechanism is adapted to selectively engage and disengage the counterweight from the fixed anchoring device.

10. The wind generator according to claim 9, wherein the counterweight is shaped to cooperate by fitting with said fixed anchoring device in a substantially vertical direction.

11. The wind generator according to claim 1, wherein the lower part of the mast has a first height and the upper part of the mast has a second height, the first height ranging between 10% and 50% of the second height, preferably between 15% and 25% of the second height.

12. The wind generator according to claim 1, wherein the lower part of the mast includes an electrical generator, the rotor driving said electrical generator through a transmission device extending along the mast.

13. The wind generator according to claim 1, wherein the main ram is able to exert an effort of 500 to 1000 t, and has an extension of 7 to 12 m.

* * * * *